(12) United States Patent
Kwon et al.

(10) Patent No.: US 11,281,064 B2
(45) Date of Patent: Mar. 22, 2022

(54) VARIABLE TRANSMITTANCE WINDOW AND MOVING MEANS COMPRISING SAME

(71) Applicant: NDIS CORPORATION, Asan-si (KR)

(72) Inventors: Soon Bum Kwon, Asan-si (KR); Burm Young Lee, Cheonan-si (KR); Hee Sang Yoo, Asan-si (KR); Da Som Yoon, Asan-si (KR)

(73) Assignee: NDIS CORPORATION, Asan-si (KR)

( * ) Notice: Subject to any disclaimer, the term of this patent is extended or adjusted under 35 U.S.C. 154(b) by 43 days.

(21) Appl. No.: 16/755,792

(22) PCT Filed: Oct. 10, 2018

(86) PCT No.: PCT/KR2018/011904
§ 371 (c)(1),
(2) Date: Jun. 26, 2020

(87) PCT Pub. No.: WO2019/074272
PCT Pub. Date: Apr. 18, 2019

(65) Prior Publication Data
US 2021/0165259 A1 Jun. 3, 2021

(30) Foreign Application Priority Data
Oct. 11, 2017 (KR) .................. 10-2017-0131635

(51) Int. Cl.
*G02F 1/139* (2006.01)
*G02F 1/1335* (2006.01)
(Continued)

(52) U.S. Cl.
CPC ........ *G02F 1/1393* (2013.01); *G02F 1/13312* (2021.01); *G02F 1/133531* (2021.01);
(Continued)

(58) Field of Classification Search
CPC ............. G02F 1/1393; G02F 1/133531; G02F 1/13312; G02F 1/133742
See application file for complete search history.

(56) References Cited

U.S. PATENT DOCUMENTS 6,007,737 A * 12/1999 Nishiyama ......... C09K 19/0225
252/299.01
6,829,025 B2 12/2004 Sakamoto
(Continued)

FOREIGN PATENT DOCUMENTS

JP 2010-008563 A 1/2010
KR 10-1999-0009845 A 2/1999
(Continued)

*Primary Examiner* — Lucy P Chien
(74) *Attorney, Agent, or Firm* — Novick, Kim & Lee, PLLC; Sang Ho Lee

(57) ABSTRACT

Provided are a transmittance variable window that maximizes user convenience and a moving means including the same including a first substrate and a second substrate facing each other; a first electrode and a first alignment layer sequentially stacked on a surface of the first substrate, the surface facing the second substrate; a second electrode and a second alignment layer sequentially stacked on a surface of the second substrate, the surface facing the first substrate; a liquid crystal layer interposed between the first alignment layer and the second alignment layer; a first polarizing plate disposed on a surface of the first substrate, the surface facing away from the second substrate; and a second polarizing plate disposed on a surface of the second substrate, the surface facing away from the first substrate, wherein if a potential difference applied between the first electrode and the second electrode is V, considering an incidence light incident on any one of the first polarizing plate and the second polarizing plate and a transmitting light passing through the other one of the first polarizing plate and the second polarizing plate, a transmittance defined as a ratio of (Continued)

the intensity of the transmitting light to the intensity of the incidence light varies between a minimum transmittance and a maximum transmittance as V changes, and an initial transmittance when V is 0 is greater than the minimum transmittance and less than the maximum transmittance.

17 Claims, 15 Drawing Sheets

(51) Int. Cl.
| | | |
|---|---|---|
| *G02F 1/133* | (2006.01) | |
| *G02F 1/1337* | (2006.01) | |
| *G02F 1/13363* | (2006.01) | |
| *G02F 1/1343* | (2006.01) | |
| *B60J 3/04* | (2006.01) | |
| *E06B 9/24* | (2006.01) | |

(52) U.S. Cl.
CPC .. *G02F 1/133638* (2021.01); *G02F 1/133742* (2021.01); *G02F 1/133784* (2013.01); *G02F 1/134309* (2013.01); *B60J 3/04* (2013.01); *E06B 9/24* (2013.01); *E06B 2009/2464* (2013.01); *G02F 2203/48* (2013.01)

(56) References Cited

U.S. PATENT DOCUMENTS

| | | | |
|---|---|---|---|
| 8,531,378 B2 | 9/2013 | Sugiyama | |
| 9,958,742 B2 | 5/2018 | Min et al. | |
| 2007/0002233 A1* | 1/2007 | Yano | G02B 5/3025 |
| | | | 349/117 |
| 2009/0073345 A1* | 3/2009 | Katoh | G02F 1/13318 |
| | | | 349/65 |
| 2018/0329245 A1* | 11/2018 | Robinson | G02B 6/0068 |
| 2018/0373084 A1 | 12/2018 | Lim et al. | |

FOREIGN PATENT DOCUMENTS

| | | |
|---|---|---|
| KR | 10-2003-0067551 A | 8/2003 |
| KR | 10-2006-0080574 A | 7/2006 |
| KR | 10-2015-0105266 A | 9/2015 |
| KR | 10-2016-0117343 A | 10/2016 |
| KR | 10-2017-0003266 A | 1/2017 |

* cited by examiner

VARIABLE TRANSMITTANCE WINDOW AND MOVING MEANS COMPRISING SAME

TECHNICAL FIELD

The present disclosure relates to a transmittance variable window and moving means including the same, and more particularly, to a transmittance variable window that maximizes user convenience and a moving means including the same.

BACKGROUND ART

In general, there are many cases where an external light blocking coating is applied to a glass window of a moving means such as a vehicle. The transmittance of the glass window of the conventional moving means is constant, and the transmittance of the external light blocking coating is also constant. Therefore, in the case of the conventional moving means, the overall transmittance is constant due to the glass window and the external light blocking coating.

DESCRIPTION OF EMBODIMENTS

Technical Problem

However, there is a problem in that the accidents may appear as the overall transmittance of the conventional transmission means or the window of the moving means is constant. For example, if the overall transmittance is set low, there is no problem during the daytime when there is enough light outside, but at night, when there is not enough light outside, there was a problem in that a driver have difficulties in properly checking the surroundings of the moving means. Or, if the overall transmittance is set high, the above problem does not occur at night when there is not enough light outside, but there is a problem in that glare may occur during the daytime when there is enough light outside.

Solution to Problem

To solve various problems including the problems described above, provided are a transmittance variable window that maximizes user convenience and a moving means including the same. However, these problems are exemplary, and the scope of the present disclosure is not limited by the problems.

According to an aspect of the present disclosure, a transmittance variable window includes a first substrate and a second substrate facing each other; a first electrode and a first alignment layer sequentially stacked on a surface of the first substrate, the surface facing the second substrate; a second electrode and a second alignment layer sequentially stacked on a surface of the second substrate, the surface facing the first substrate; a liquid crystal layer interposed between the first alignment layer and the second alignment layer; a first polarizing plate disposed on a surface of the first substrate, the surface facing away from the second substrate; and a second polarizing plate disposed on a surface of the second substrate, the surface facing away from the first substrate, wherein if a potential difference applied between the first electrode and the second electrode is V, considering an incident light incident on any one of the first polarizing plate and the second polarizing plate and a transmitting light passing through the other one of the first polarizing plate and the second polarizing plate, a transmittance defined as a ratio of the intensity of the transmitting light to the intensity of the incidence light varies between a minimum transmittance and a maximum transmittance as V changes, and an initial transmittance when V is 0 is greater than the minimum transmittance and less than the maximum transmittance.

ADVANTAGEOUS EFFECTS OF DISCLOSURE

According to an embodiment of the present disclosure as described above, it is possible to implement a transmittance variable window that maximizes user convenience and a moving means including the same. The scope of the present disclosure is not limited by these effects.

BEST MODE

Figure 1:
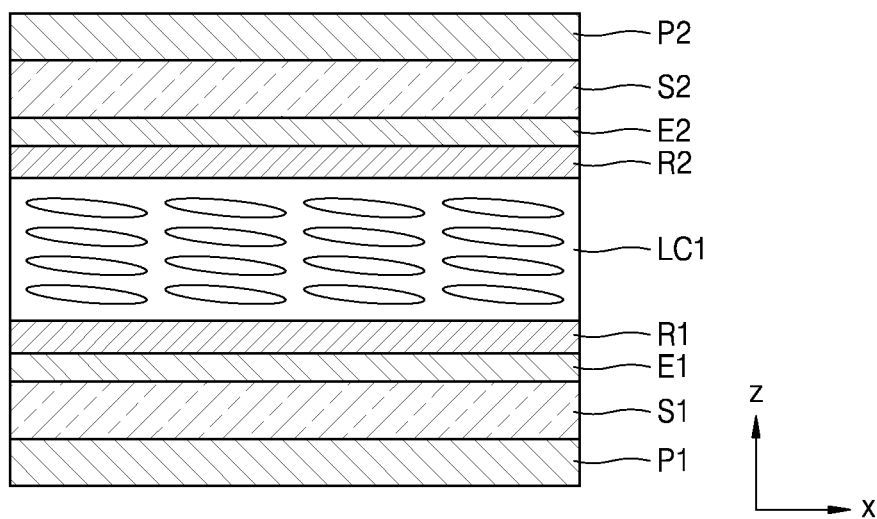
FIG. 1 is a cross-sectional view schematically showing a transmittance variable window according to an embodiment of the present disclosure.

According to an aspect of the present disclosure, a transmittance variable window includes a first substrate and a second substrate facing each other; a first electrode and a first alignment layer sequentially stacked on a surface of the first substrate, of the surface facing the second substrate; a second electrode and a second alignment layer sequentially stacked on a surface of the second substrate, the surface facing the first substrate; a liquid crystal layer interposed between the first alignment layer and the second alignment layer; a first polarizing plate disposed on a surface of the first substrate, the surface facing away from the second substrate; and a second polarizing plate disposed on a surface of the second substrate, the surface facing away from the first substrate, wherein if a potential difference applied between the first electrode and the second electrode is V, considering an incident light incident on any one of the first polarizing plate and the second polarizing plate and a transmittance light passing through the other one of the first polarizing plate and the second polarizing plate, a transmittance defined as a ratio of the intensity of the transmittance light to the intensity of the incidence light varies between a minimum transmittance and a maximum transmittance as V changes, and an initial transmittance when V is 0 is greater than the minimum transmittance and less than the maximum transmittance.

As V increases from 0, the transmittance may decrease from the initial transmittance to reach the minimum transmittance and then increase to reach the maximum transmittance, or the transmittance may increase from the initial transmittance to reach the maximum transmittance and then decrease to reach the minimum transmittance.

A rubbing direction of the first alignment layer and a rubbing direction of the second alignment layer may be opposite, a first transmission axis of the first polarizing plate which is a linear polarizing plate may form an angle of 45 degrees with the rubbing direction of the first alignment layer, and a second transmission axis of the second polarizing plate which is a linear polarizing plate may be parallel or perpendicular to the first transmission axis.

When the liquid crystal layer is a liquid crystal layer operating in an electrically controlled birefringence (ECB) mode, an extraordinary refractive index of the liquid crystal layer is $n_e$, an ordinary refractive index is $n_o$, a minimum value of a ratio of a refractive index anisotropy of the liquid crystal layer is $\alpha$ when V is not 0 with respect to $n_e - n_o$, a wavelength of light incident on the first polarizing plate is $\lambda$, and m is an integer greater than or equal to 0, a thickness d of the liquid crystal layer may satisfy Equation 9 below;

$$\frac{m}{2} + 1 < \frac{(n_e - n_o)d}{\lambda} \leq \frac{(m+1)}{2\alpha} \quad \text{[Equation 9]}$$

The transmittance variable window may further include a retardation plate interposed between the second substrate and the second polarizing plate, and an optical axis of the retardation plate may be perpendicular to a rubbing direction of the first alignment layer. In this case, when the liquid crystal layer is a liquid crystal layer operating in an ECB mode, an extraordinary refractive index of the liquid crystal layer is $n_e$, an ordinary refractive index is $n_o$, a phase difference of the retardation plate is $R_0$, a minimum value of a ratio of a refractive index anisotropy of the liquid crystal layer is $\alpha$ when V is not 0 with respect to $n_e - n_o$, a wavelength of light incident on the first polarizing plate is $\lambda$, and m is an integer greater than or equal to 0, a thickness d of the liquid crystal layer may satisfy Equation 16 below;

$$R_o + \frac{(m+1)}{2}\lambda < (n_e - n_o)d \leq \frac{R_o}{\alpha} + \frac{m}{2\alpha}\lambda, \quad \text{[Equation 16]}$$

$$\text{for } R_o < \left(\frac{\alpha}{1-\alpha} - \frac{m}{2}\right)\lambda$$

$$R_o + \frac{(m+1)}{2}\lambda < (n_e - n_o)d < R_o + \frac{m+2}{2}\lambda,$$

$$\text{for } R_o \geq \left(\frac{\alpha}{1-\alpha} - \frac{m}{2}\right)\lambda$$

When the liquid crystal layer is a liquid crystal layer operating in a vertically aligned (VA) mode, an extraordinary refractive index of the liquid crystal layer is $n_e$, an ordinary refractive index is $n_o$, a phase difference of the retardation plate is $R_0$, a maximum value of a ratio of a refractive index anisotropy of the liquid crystal layer is $\beta$ when V is not 0 with respect to $n_e - n_o$, a wavelength of light incident on the first polarizing plate is $\lambda$, and m is an integer greater than or equal to 0, a thickness d of the liquid crystal layer may satisfy Equation 20 below;

$$\frac{m\lambda}{2} < R_o < \frac{(m+1)\lambda}{2}, (n_e - n_o)d \geq \frac{2R_o - (m-1)\lambda}{2\beta} \quad \text{[Equation 20]}$$

When an optical axis of the retardation plate is parallel to a rubbing direction of the first alignment layer, when the liquid crystal layer is a liquid crystal layer operating in a VA mode, an extraordinary refractive index of the liquid crystal layer is $n_e$, an ordinary refractive index is $n_o$, a phase difference of the retardation plate is $R_0$, a maximum value of a ratio of a refractive index anisotropy of the liquid crystal layer is $\beta$ when V is not 0 with respect to $n_e - n_o$, a wavelength of light incident on the first polarizing plate is $\lambda$, and m is an integer greater than or equal to 0, a thickness d of the liquid crystal layer may satisfy Equation 25 below;

$$\frac{m\lambda}{2} < R_o < \frac{(m+1)\lambda}{2}, \quad \text{[Equation 25]}$$

$$(n_e - n_o)d \geq \frac{-2R_o + (m+2)\lambda}{2\beta}$$

$\lambda$ may be 550 nm.

The transmittance variable window may further include a sensor configured to detect an ambient brightness, and V may be adjusted according to the ambient brightness detected by the sensor.

At least one of the first polarizing plate and the second polarizing plate may be a reflective polarizing plate.

According to another aspect of the present disclosure, a moving apparatus equipped with at least one of the transmittance variable windows described above is provided.

Other aspects, features and advantages of the present disclosure will become better understood through the accompanying drawings, the claims and the detailed description.

MODE OF DISCLOSURE

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

The exemplary embodiments will be described below in more detail with reference to the accompanying drawings. Those components that are the same or are in correspondence are rendered the same reference numeral regardless of the figure number, and redundant explanations are omitted.

It will be understood that when various components such as a layer, a film, a region, a plate, etc. are referred to as being "formed on" another component, it can be directly or indirectly formed on the other component as well as intervening components may be present. Sizes of components in the drawings may be exaggerated for convenience of explanation. In other words, since sizes and thicknesses of components in the drawings are arbitrarily illustrated for convenience of explanation, the following embodiments are not limited thereto.

In the following embodiments, x-axis, y-axis, and z-axis are not limited to three axes on an orthogonal coordinate system, and can be interpreted in a broad sense including the axes. For example, the x-axis, y-axis, and z-axis may be orthogonal to each other, but may refer to different directions that are not orthogonal to each other.

FIG. 1 is a cross-sectional view schematically showing a transmittance variable window according to an embodiment of the present disclosure. The transmittance variable window according to the present embodiment includes a first polarizing plate P1, a first substrate S1, a first electrode E1, a first alignment layer R1, a liquid crystal layer LC1, a second alignment layer R2, a second electrode E2, a second substrate S2, and a second polarizing plate P2.

The first substrate S1 and the second substrate S2 are opposed to each other. The first substrate S1 and the second substrate S2 may include various materials, for example, may include a glass material or a transparent polymer material. In the latter case, the first substrate S1 and the second substrate S2 may include a polymer resin such as polyethersulphone (PES), polyacrylate (PAR), polyetherimide (PEI), polyethyelenen napthalate (PEN), polyethylene terephtalate (PET), Polyphenylene sulfide (PPS), polyarylate (PAR), polyimide (PI), polycarbonate (PC) or cellulose acetate propionate (CAP). Since such a polymer resin has flexible characteristics, it is possible to implement the transmittance variable window in various shapes according to various uses.

The first electrode E1 and the first alignment layer R1 are sequentially stacked on the surface of the first substrate S1 in the direction (+z direction) to the second substrate S2. The surface on which the first electrode E1 and the first alignment layer R1 are sequentially stacked faces the second substrate S2. The first electrode E1 may include a transparent and conductive material. For example, the first electrode E1 may include indium tin oxide (ITO), indium zinc oxide (IZO), zinc oxide (ZnO), indium oxide ($In_2O_3$), indium gallium oxide (IGO) or aluminum zinc oxide (AZO). The first alignment layer R1 may include polyimide, polyvinyl alcohol or polyamic acid. The first alignment layer R1 is rubbed in a specific direction.

The second electrode E2 and the second alignment layer R2 are sequentially stacked on the surface of the second substrate S2 in the direction to the first substrate S1. The surface on which the second electrode E2 and the second alignment layer R2 are sequentially stacked faces the first substrate S1. As the material that may be included in the second electrode E2 and the second alignment layer R2, the material described with respect to the first electrode E1 and the first alignment layer R1 may be applied as it is. The second alignment layer R2 is also rubbed in a specific direction.

The liquid crystal layer LC1 is interposed between the first alignment layer R1 and the second alignment layer R2. The first polarizing plate P1 is disposed on the surface of the first substrate S1 in a direction (−z direction) opposite to the direction to the second substrate S2, and the second polarizing plate P2 is disposed on the surface of the second substrate S2 in a direction (+z direction) opposite to the direction to the first substrate S1. The surface on which the first polarizing plate P1 is disposed faces away the second substrate S2. Each of the first polarizing plate P1 and the second polarizing plate P2 may be a linear polarizing plate.

When considering an incidence light incident on one of the first polarizing plate P1 and the second polarizing plate P2, and a transmitting light passing through the other one of the first polarizing plate P1 and the second polarizing plate P2, the transmittance of the transmittance variable window according to the present embodiment may be a ratio of the intensity of the transmitting light to the intensity of the incidence light. For example, the transmittance may be referred to as a ratio of the intensity of the transmitting light incident on the first polarizing plate P1 and passing through the second polarizing plate P2 to the intensity of the incidence light entering the first polarizing plate P1. This also applies to the embodiments described later and their modifications.

In the transmittance variable window according to the present embodiment, when the potential difference applied between the first electrode E1 and the second electrode E2 is V, the transmittance changes as V changes. Accordingly, the transmittance variable window has a minimum transmittance and a maximum transmittance as V changes. In particular, in the transmittance variable window according to the present embodiment, an initial transmittance when V is 0 is greater than the minimum transmittance and less than the maximum transmittance.

In the case of the transmittance variable window according to the present embodiment, a user may adjust the transmittance by adjusting the voltage V applied between the first electrode E1 and the second electrode E2, thereby appropriately adjusting the transmittance according to the surrounding environment. For example, by adjusting the voltage V such that the transmittance of the transmittance variable window decreases during the daytime when the amount of light is sufficient and adjusting the voltage V such that the transmittance of the transmittance variable window increases during the night time when the amount of light is insufficient, a window having an appropriate transmittance may be always implemented.

Furthermore, the transmittance variable window according to the present embodiment may minimize power consumption. As described above, the initial transmittance when the voltage V applied between the first electrode E1 and the second electrode E2 is 0 is greater than the minimum transmittance and less than the maximum transmittance. Therefore, an environment in which the transmittance variable window according to the present embodiment is to be mainly used is analyzed, and accordingly, the initial transmittance when the voltage V applied between the first electrode E1 and the second electrode E2 is 0 is the transmittance suitable for the environment, and thus the overall power consumption may be minimized.

For example, the transmittance of the transmittance variable window may have a maximum transmittance when the voltage V applied between the first electrode E1 and the second electrode E2 is 0, and then the transmittance may decrease as the voltage V increases. At this time, if a situation in which the transmittance variable window is mainly used is a situation in which the amount of light is abundant, a significant portion of the time at which the transmittance variable window is used needs to prevent a part of an external light from passing through the transmittance variable window by apply a non-zero voltage to the first electrode E1 and the second electrode E2. In this case, power is forced to be consumed for the significant portion of the time at which the transmittance variable window is used.

However, in the case of the transmittance variable window according to the present embodiment, as described above, when the voltage V applied between the first electrode E1 and the second electrode E2 is 0, the initial transmittance is greater than the minimum transmittance and less than the maximum transmittance. Therefore, by making the initial transmittance when the voltage V is 0 to be the transmittance required at a time when the transmittance variable window is mainly used, the total power consumption during the entire time at which the transmittance variable window is used may be significantly reduced.

Meanwhile, even in the same environment, the preferred transmittance may be different depending on users. As described above, in the transmittance variable window according to the present embodiment, since the initial transmittance when the voltage V is 0 is fixed to a specific transmittance between the minimum transmittance and the maximum transmittance, such an initial transmittance is set according to the needs of a user, and thus in the environment used by each user, the entire power consumption may be minimized.

Hereinafter, setting the initial transmittance to a specific value between the minimum transmittance and the maximum transmittance will be described.

Figure 2:
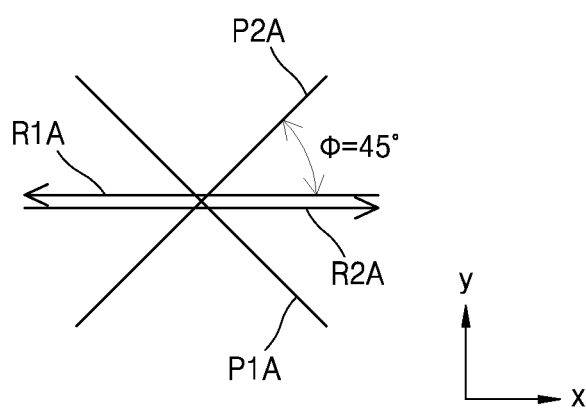
FIG. 2 is a conceptual diagram schematically showing a transmission axis and a rubbing direction of components of the transmittance variable window of FIG. 1.

FIG. 2 is a conceptual diagram schematically showing a transmission axis P1A and the rubbing direction R1A of components of a transmittance variable window of FIG. 1. As shown in FIG. 2, a rubbing direction R1A (-x direction) of the first alignment layer R1 and a rubbing direction R2A (+x direction) of the second alignment layer R2 may be opposite directions, the transmission axis P1A of the polarizing plate P1 which is a linear polarizing plate may form a 45 degree angle with the rubbing direction R1A of the first alignment layer R1, and a transmission axis P2A of the second polarizing plate P2 which is also a linear polarizing plate may be perpendicular to the transmission axis P1A.

In such an environment, if the liquid crystal layer LC1 operates in an electrically controlled birefringence (ECB) mode, the transmittance of the transmittance variable window is T(T) which is a function of the voltage V applied between the first electrode E1 and the second electrode E2 and may be expressed as Equation 1 below.

$$T(V) = \tfrac{1}{2} \sin^2(\pi X(V))$$ [Equation 1]

At this time, X (V) is a function of the voltage V applied between the first electrode E1 and the second electrode E2 and can be expressed as in Equation 2 below.

$$X(V) = \frac{\Delta n(V) d}{\lambda}$$ [Equation 2]

where d denotes the thickness of the liquid crystal layer LC1, $\lambda$ denotes the wavelength of the light incident to the first polarizing plate P1, and $\Delta n(V)$ denotes a function of the voltage V applied between the first electrode E1 and the second electrode E2 as a refractive index anisotropy of the liquid crystal layer LC1. In the ECB mode, $\Delta n(V)$ has a maximum value of $n_e - n_o$ when V is 0, and decreases as V increases, and finally has $\alpha(n_e - n_o)$. That is, the minimum value of a ratio of the refractive index anisotropy of the liquid crystal layer LC1 when V is not 0 with respect to $n_e - n_o$ may be referred to as $\alpha$. $\alpha$ is approximately 0.2 when a general liquid crystal is used. For reference, $n_e$ denotes an extraordinary refractive index of the liquid crystal layer LC1, and $n_o$ denotes an ordinary refractive index of the liquid crystal layer LC1. As such, $\Delta n(V)$ decreases as V increases, and thus X(V) also decreases as V increases.

Figure 3:
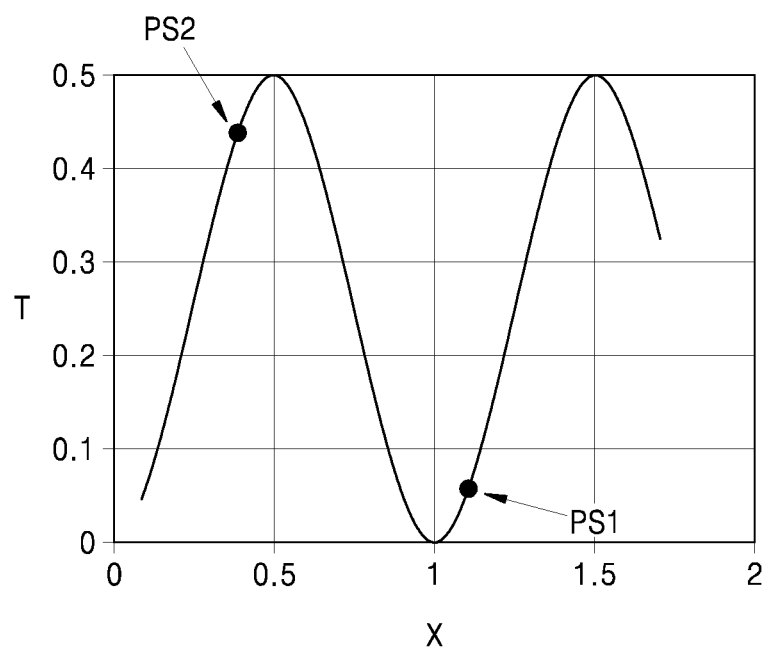
FIG. 3 is a graph illustrating a condition satisfied by the transmittance variable window of FIG. 1.

FIG. 3 is a graph illustrating a condition satisfied by a transmittance variable window of FIG. 1, wherein a horizontal axis is X, and a vertical axis is transmittance T of the transmittance variable window. The graph is a graph according to Equation 1. As described above, in the transmittance variable window according to the present embodiment, since the initial transmittance when V is 0 is greater than the minimum transmittance and less than the maximum transmittance, a point where V is 0 may appear, for example, as indicated by PS1 in the graph of FIG. 3. That is, X(0) may be greater than 1 and less than 1.5. In such a situation, if V starts to increase from 0, since X(V) decreases at X(0), the transmittance gradually decreases to reach the minimum transmittance and then increases to reach the maximum transmittance. At this time, in order to ensure that the transmittance variable window necessarily reaches the maximum transmittance, a point at which the voltage V applied between the first electrode E1 and the second electrode E2 is the maximum value $V_{max}$ needs to appear as indicated by PS2 in the graph of FIG. 3. That is, $X(V_{max})$ must be 0.5 or less than 0.5. This is because V reaches or passes by a point where the transmittance is the maximum, that is, the point where X is 0.5 in a process of increasing from 0 and reaching the maximum value $V_{max}$.

For reference, the point where V is 0, that is, X(0) may not be less than 1. If X(0) is greater than 0.5 and less than 1, in this case, X(V) decreases as V increases from 0, that is, the transmittance increases. Accordingly, if X becomes 0.5, the transmittance becomes the maximum, and then, as V increases, X(V) decreases and the transmittance decreases. However, in the range where X is less than 0.5, since the transmittance does not reach 0, the minimum transmittance does not reach 0. This is because the minimum transmittance is not 0 in the vicinity of the first alignment layer R1 and/or the second alignment layer R2 of the liquid crystal layer LC1 since the movement of the liquid crystal is limited by the first alignment layer R1 and/or the second alignment layer R2. Therefore, in order for the transmittance to have the maximum transmittance and the minimum transmittance as V changes, X(0) needs to be greater than 1 as described above.

As such, X(0) must be greater than 1, and $X(V_{max})$ must be 0.5 or less. This may be expressed by Equation 3 and Equation 4 shown below.

$$X(0) = \frac{(n_e - n_o)d}{\lambda} > 1 \quad \text{[Equation 3]}$$

$$X(V_{max}) = \frac{\alpha(n_e - n_o)d}{\lambda} \leq \frac{1}{2} \quad \text{[Equation 4]}$$

From Equation 3 and Equation 4, Equation 5 is obtained as shown below.

$$1 < \frac{(n_e - n_o)d}{\lambda} \leq \frac{1}{2\alpha} \quad \text{[Equation 5]}$$

where λ is a determined value because λ is a wavelength of an incidence light, and $n_e$, $n_o$, and α are also values determined by physical properties of the liquid crystal layer LC1, and consequently, the condition of Equation 5 is a condition with respect to a thickness d of the liquid crystal layer LC1. Therefore, by setting the thickness d of the liquid crystal layer LC1 to satisfy Equation 5, the initial transmittance when the voltage V applied between the first electrode E1 and the second electrode E2 is 0 is a value between the minimum transmittance and the maximum transmittance such that the transmittance variable window may have a predetermined transmittance without power consumption. In addition, as the voltage V applied between the first electrode E1 and the second electrode E2 increases, the transmittance decreases to reach the minimum transmittance, and again, the transmittance increases to reach the maximum transmittance. When a user makes the transmittance of the transmittance variable window higher than the initial transmittance, it is necessary to apply only a voltage corresponding thereto between the first electrode E1 and the second electrode E2 and it is not necessary that the transmittance of the transmittance variable window decreases and then increases again.

Meanwhile, the initial transmittance is determined by X(0), and X(0) may be expressed by Equation 6 from Equation 2 as shown below.

$$X(0) = \frac{(n_e - n_o)d}{\lambda} \quad \text{[Equation 6]}$$

where λ is a determined value because λ is a wavelength of an incidence light, and $n_e$ and $n_o$ are also values determined by physical properties of the liquid crystal layer LC1, and consequently, it may be seen that if the thickness d of the liquid crystal layer LC1 is adjusted, the initial transmittance when V is 0 may be adjusted. Therefore, when manufacturing the transmittance variable window, on the premise that Equation 5 is satisfied, the thickness d of the liquid crystal layer LC1 is adjusted, and thus the transmittance variable window may have the initial transmittance desired by the user.

Meanwhile, the case where X(0) is greater than 1 and $X(V_{max})$ is 0.5 or less is described above, but the present disclosure is not limited thereto. For example, referring to FIG. 3, it may be seen that even if X(0) is greater than 1.5 and $X(V_{max})$ is 1 or less, the initial transmittance is greater than the minimum transmittance and less than the maximum transmittance, and the transmittance of the transmittance variable window varies from the minimum transmittance to the maximum transmittance by adjusting the voltage V applied between the first electrode E1 and the second electrode E2. In this case, if V starts to increase from 0, since X(V) decreases at X(0), the transmittance gradually increases to reach the maximum transmittance and then decreases to reach the minimum transmittance. Also, it may be seen that even if X(0) is greater than 2 and $X(V_{max})$ is 1.5 or less, the initial transmittance is greater than the minimum transmittance and less than the maximum transmittance, and the transmittance of the transmittance variable window varies from the minimum transmittance to the maximum transmittance by adjusting the voltage V applied between the first electrode E1 and the second electrode E2. Therefore, when generalizing this, Equation 3 and Equation 4 may be generalized as Equations 7 and 8 shown below.

$$X(0) = \frac{(n_e - n_o)d}{\lambda} > 1 + \frac{m}{2} \quad \text{[Equation 7]}$$

$$X(V_{max}) = \frac{\alpha(n_e - n_o)d}{\lambda} \leq \frac{m+1}{2} \quad \text{[Equation 8]}$$

where m denotes an integer of 0 or more. Equations 3 and 4 may be understood as the case where m=0. From Equation 7 and Equation 8, Equation 9 is obtained as shown below.

$$\frac{m}{2} + 1 < \frac{(n_e - n_o)d}{\lambda} \leq \frac{(m+1)}{2\alpha} \quad \text{[Equation 9]}$$

Equation 9 is satisfied as described above, thereby implementing the transmittance variable window in which the initial transmittance when the voltage V applied between the first electrode E1 and the second electrode E2 is 0 is greater than the minimum transmittance and less than the maximum transmittance, and the transmittance is variable from the minimum transmittance to the maximum transmittance by adjusting the voltage V. As described above, when manufacturing the transmittance variable window, the thickness of the liquid crystal layer LC1 is appropriately set, and thus the initial transmittance may also be a desired value.

Figure 4:
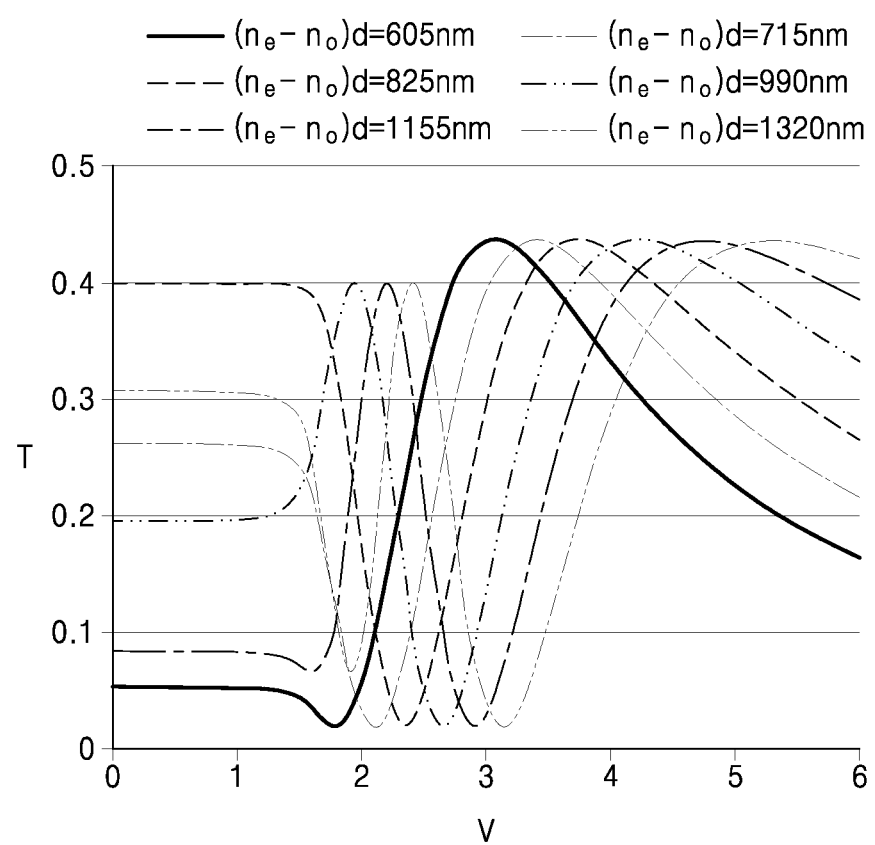
FIG. 4 is a graph schematically showing a change in the transmittance according to a voltage in the transmittance variable window of FIG. 1.

FIG. 4 is a graph schematically showing a change in a transmittance T according to the voltage V in a transmittance variable window of FIG. 1. FIG. 4 shows, in a state where the wavelength λ of an incidence light is fixed to 550 nm, when values of $(n_e - n_o)d$ are 605 nm, 715 nm, 825 nm, 990 nm, 1155 nm, and 1320 nm, the change in the transmittance T according to the voltage V between the first electrode E1 and the second electrode E2. As may be confirmed in FIG. 4, it may be seen that when V is 0, the initial transmittance is all greater than the minimum transmittance and less than the maximum transmittance, and as V increases, the transmittance T changes from the minimum transmittance to the maximum transmittance. As may be confirmed in FIG. 8, the initial transmittance may be variously set, and thus, the transmittance variable window of a low power consumption that meets the user's needs may be implemented.

Figure 5:
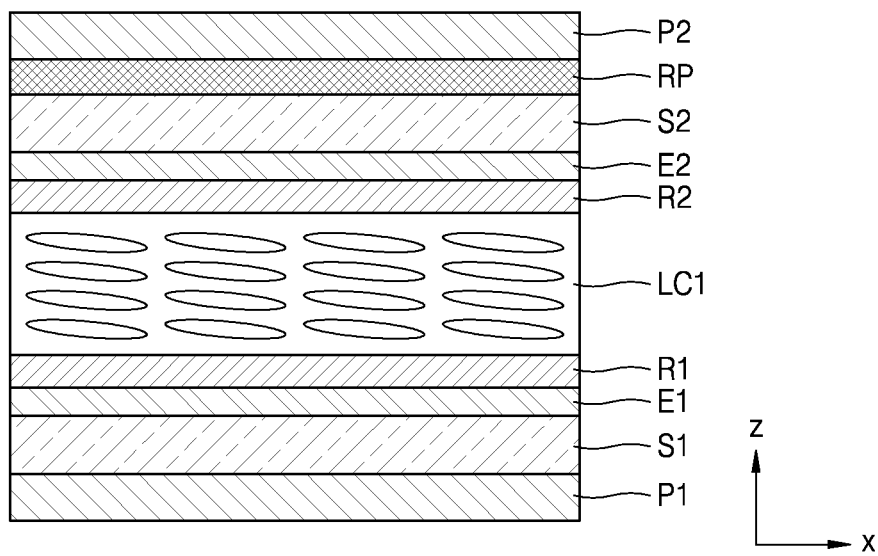
FIG. 5 is a cross-sectional view schematically showing a transmittance variable window according to another embodiment of the present disclosure.
Figure 6:
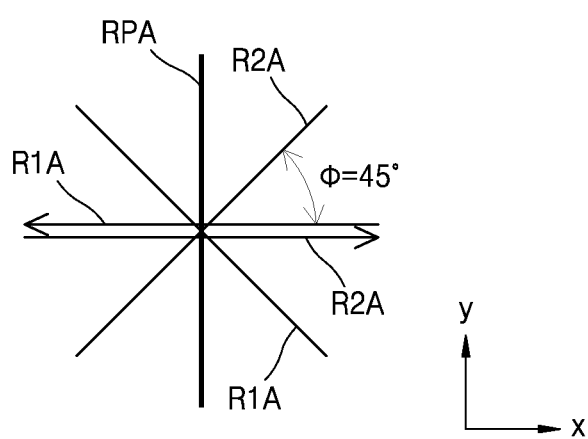
FIG. 6 is a conceptual diagram schematically showing a transmission axis and a rubbing direction of components of the transmittance variable window of FIG. 5.

FIG. 5 is a cross-sectional view schematically showing a transmittance variable window according to another embodiment of the present disclosure. The transmittance variable window according to the present embodiment differs from the transmittance variable window described above with reference to FIG. 1 in that the transmittance variable window further includes a retardation plate RP interposed between the second substrate S2 and the second polarizing plate P2. At this time, the optical axis (e.g., a retardation axis RPA) of the retardation plate RP is perpendicular to the rubbing direction R1A of the first alignment layer R1 as shown in FIG. 6.

In the case of the transmittance variable window according to the present embodiment, Equation 1 described above is applied as it is, but Equation 2 is modified as shown in Equation 10 due to the presence of the retardation plate RP.

$$X(V) = \frac{\Delta n(V)d - R_o}{\lambda} \quad \text{[Equation 10]}$$

Figure 7:
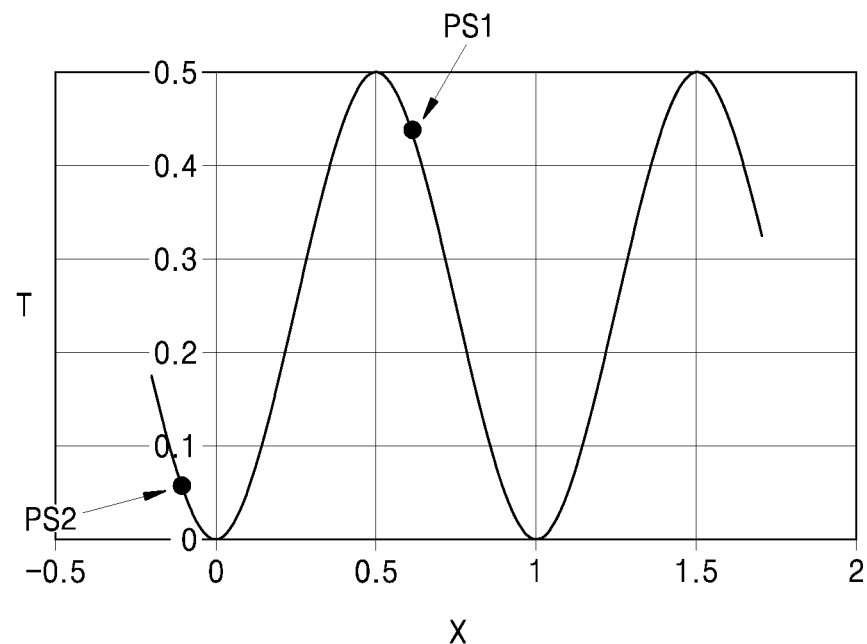
FIG. 7 is a graph illustrating a condition satisfied by the transmittance variable window of FIG. 5.

FIG. 7 is a graph illustrating a condition satisfied by a transmittance variable window of FIG. 5, wherein a horizontal axis is X, and a vertical axis is transmittance T of the transmittance variable window. The graph is a graph according to Equation 1. As described above, in the transmittance variable window according to the present embodiment, since the initial transmittance when V is 0 is greater than the minimum transmittance and less than the maximum transmittance, a point where V is 0 may appear, for example, as indicated by PS1 in the graph of FIG. 7. That is, X(0) may be greater than 0.5 and less than 1. In such a situation, if V starts to increase from 0, since X(V) decreases at X(0), the transmittance gradually increases to reach the maximum transmittance and then decreases to reach the minimum transmittance. At this time, in order to ensure that the transmittance variable window necessarily reaches the minimum transmittance, a point at which the voltage V applied between the first electrode E1 and the second electrode E2 is the maximum value $V_{max}$ needs to appear as indicated by PS2 in the graph of FIG. 7. That is, $X(V_{max})$ must be 0 or less than 0. This is because V reaches or passes by a point where the transmittance is the minimum, that is, the point where X is 0 in a process of increasing from 0 and reaching the maximum value $V_{max}$.

The conditions of X(0) and $X(V_{max})$ may be expressed by Equation 11 and Equation 12 shown below.

$$\frac{1}{2} < X(0) = \frac{(n_e - n_o)d - R_o}{\lambda} < 1 \quad \text{[Equation 11]}$$

$$X(V_{max}) = \frac{\alpha(n_e - n_o)d - R_o}{\lambda} \leq 0 \quad \text{[Equation 12]}$$

Equation 11 and Equation 12 may be expressed as Equations 13 and 14 below.

$$R_0 + \frac{\lambda}{2} < (n_e - n_0)d < R_o + \lambda \quad \text{[Equation 13]}$$

$$(n_e - n_0)d \leq \frac{R_o}{\alpha} \quad \text{[Equation 14]}$$

From Equation 13 and Equation 14, Equation 15 is obtained according to the magnitude relationship of $R_0+\lambda$ and $R_0/\alpha$ as shown below.

$$R_o + \frac{1}{2}\lambda < (n_e - n_o)d \leq \frac{R_o}{\alpha}, \text{ for } R_o < \left(\frac{\alpha}{1-\alpha}\right)\lambda \quad \text{[Equation 15]}$$

$$R_o + \frac{1}{2}\lambda < (n_e - n_o)d < R_o + \lambda, \text{ for } R_o \geq \left(\frac{\alpha}{1-\alpha}\right)\lambda$$

As may be seen in FIG. 7, X(0) where V is 0 may be greater than 1 and less than 1.5, and $X(V_{max})$ where V is $V_{max}$ may be 0.5 or less. In addition, X(0) where V is 0 may be greater than 1.5 and less than 2, and $X(V_{max})$ where V is $V_{max}$ may be 1 or less. Therefore, Equation 15 may be generalized as Equation 16 below.

$$R_o + \frac{(m+1)}{2}\lambda < (n_e - n_0)d \leq \frac{R_o}{\alpha} + \frac{m}{2\alpha}\lambda, \quad \text{[Equation 16]}$$

$$\text{for } R_o < \left(\frac{\alpha}{1-\alpha} - \frac{m}{2}\right)\lambda$$

$$R_o + \frac{(m+1)}{2}\lambda < (n_e - n_0)d < R_o + \frac{m+2}{2}\lambda,$$

$$\text{for } R_o \geq \left(\frac{\alpha}{1-\alpha} - \frac{m}{2}\right)\lambda$$

where m is an integer of 0 or more. Equation 15 may be understood as the case where m=0. Equation 16 is satisfied as described above, thereby implementing the transmittance variable window in which the initial transmittance when the voltage V applied between the first electrode E1 and the second electrode E2 is 0 is greater than the minimum transmittance and less than the maximum transmittance, and the transmittance is variable from the minimum transmittance to the maximum transmittance by adjusting the voltage V. As described above, when manufacturing the transmittance variable window, the thickness of the liquid crystal layer LC1 is appropriately set, and thus the initial transmittance may also be a desired value.

Figure 8:
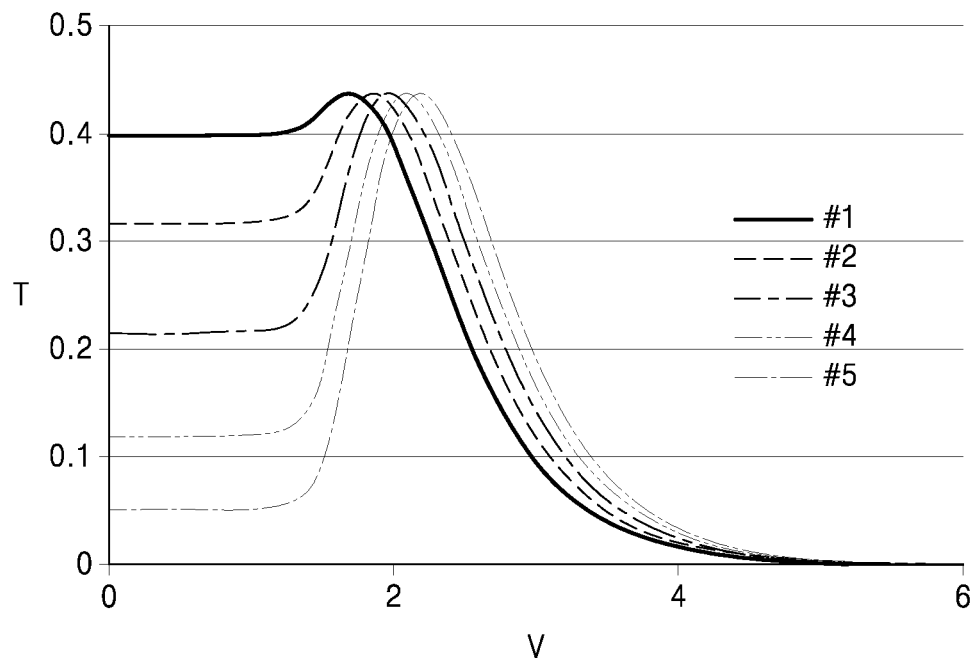
FIG. 8 is a graph schematically showing a change in transmittance according to a voltage in the transmittance variable window of FIG. 5.

FIG. 8 is a graph schematically showing a change in the transmittance T according to the voltage V in a transmittance variable window of FIG. 5. FIG. 8 shows, in a state where the wavelength λ of an incidence light is fixed to 550 nm, when values of $(n_e-n_o)d$ and $R_0$ are set as shown in Table 1 below, the change in the transmittance T according to the voltage V between the first electrode E1 and the second electrode E2.

TABLE 1

|  | #1 | #2 | #3 | #4 | #5 |
|---|---|---|---|---|---|
| $(n_e-n_o)d$ | 440 | 500 | 560 | 620 | 680 |
| $R_0$ | 92.4 | 105.0 | 117.6 | 130.2 | 142.8 |

All units in Table 1 are nm. As may be confirmed in FIG. 8, it may be seen that when V is 0, the initial transmittance is all greater than the minimum transmittance and less than the maximum transmittance, and as V increases, the transmittance T changes from the minimum transmittance to the maximum transmittance. As may be confirmed in FIG. 4, the initial transmittance may be variously set, and thus, the transmittance variable window of a low power consumption that meets the user's needs may be implemented.

Figure 9:
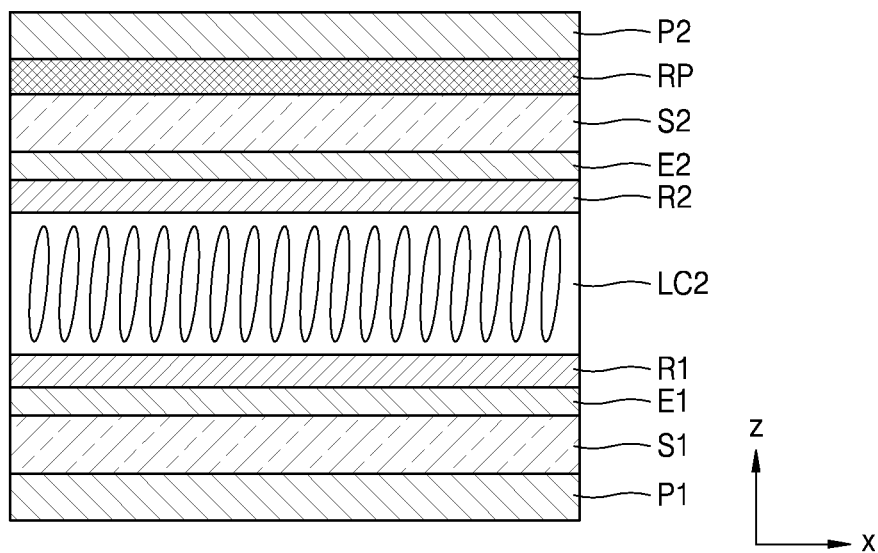
FIG. 9 is a cross-sectional view schematically showing a transmittance variable window according to another embodiment of the present disclosure.
Figure 10:
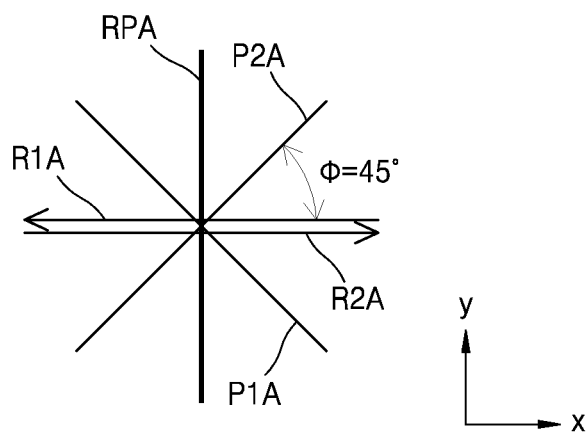
FIG. 10 is a conceptual diagram schematically showing a transmission axis and a rubbing direction of components of the transmittance variable window of FIG. 9.

FIG. 9 is a cross-sectional view schematically showing a transmittance variable window according to another embodiment of the present disclosure. FIG. 10 is a conceptual diagram schematically showing the transmission axis P1A and the rubbing direction R1A of components of the transmittance variable window of FIG. 9.

The transmittance variable window according to the present embodiment differs from the transmittance variable window described above with reference to FIG. 5 in that a liquid crystal layer LC2 operates in a vertically aligned (VA) mode. In the case of the transmittance variable window according to the present embodiment, Equation 1 and Equation 10 are applied as they are. However, since the liquid crystal layer LC2 operates in the VA mode rather than an ECB mode, $\Delta n(V)$ which is the refractive index anisotropy of the liquid crystal layer LC2 is different from that in the above-described embodiment. Specifically, in the VA mode, $\Delta n(V)$ has a minimum value (approximately 0) when V is 0, and increases as V increases, and finally has $\beta(n_e - n_o)$. That is, the maximum value of the ratio of the refractive index anisotropy of the liquid crystal layer LC2 when V is not 0 with respect to $n_e - n_o$ may be referred to as $\beta$. $\beta$ is approximately 0.8 when a general liquid crystal is used. As such, $\Delta n(V)$ increases as V increases, and thus X(V) also increases as V increases. Therefore, X(V) has a minimum value and a maximum value as in Equation 17 below.

$$X(0) = -\frac{R_o}{\lambda} \le X(V) \le \frac{\beta(n_e - n_o)d - R_o}{\lambda} = X(V_{max}) \quad \text{[Equation 17]}$$

Figure 11:
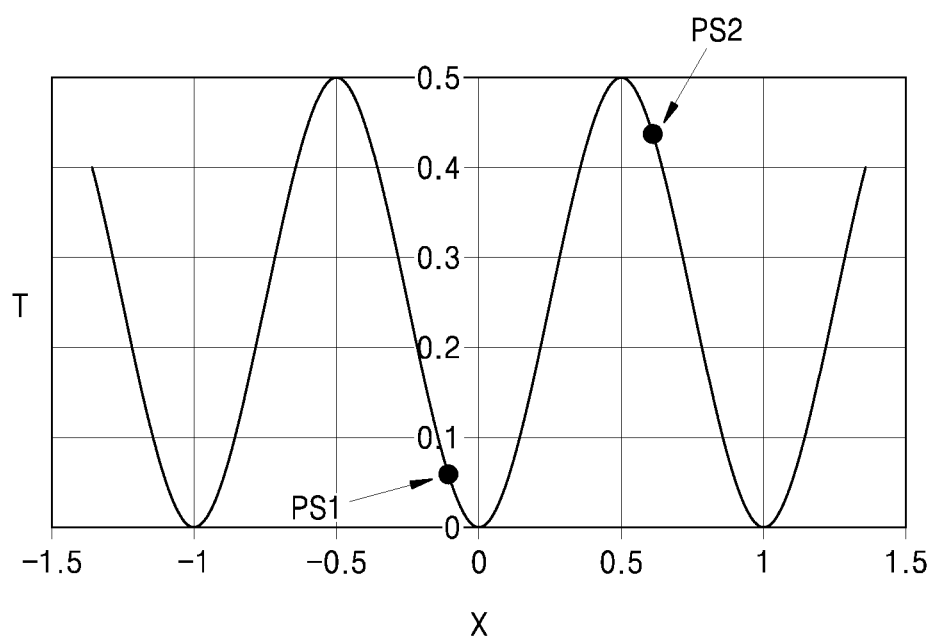
FIG. 11 is a graph illustrating a condition satisfied by the transmittance variable window of FIG. 9.

FIG. 11 is a graph illustrating a condition satisfied by the transmittance variable window of FIG. 9. As described above, in the transmittance variable window according to the present embodiment, since the initial transmittance when V is 0 is greater than the minimum transmittance and less than the maximum transmittance, a point where V is 0 may appear, for example, as indicated by PS1 in the graph of FIG. 11. That is, X(0) may be greater than −0.5 and less than 0. In such a situation, if V starts to increase from 0, since X(V) decreases at X(0), the transmittance gradually decreases to reach the minimum transmittance and then increases to reach the maximum transmittance. At this time, in order to ensure that the transmittance variable window necessarily reaches the maximum transmittance, a point at which the voltage V applied between the first electrode E1 and the second electrode E2 is the maximum value $V_{max}$ needs to appear as indicated by PS2 in the graph of FIG. 11. That is, $X(V_{max})$ must be 0.5 or less than 0.5.

This is because V reaches or passes by a point where the transmittance is the maximum, that is, the point where X is 0.5 in a process of increasing from 0 and reaching the maximum value $V_{max}$.

As may be seen in FIG. 11, X(0) may be greater than −1 and less than 0.5, and $X(V_{max})$ may be 0 or have a value greater than 0. X(0) may be greater than −1.5 and less than −1, and $X(V_{max})$ may be −0.5 or have a value greater than −0.5. Such conditions may be expressed by Equation 18 and Equation 19 shown below.

$$-\frac{m+1}{2} < X(0) = -\frac{R_o}{\lambda} < -\frac{m}{2} \quad \text{[Equation 18]}$$

$$X(V_{max}) = \frac{\beta(n_e - n_o)d - R_o}{\lambda} \ge -\frac{(m-1)}{2} \quad \text{[Equation 19]}$$

where m denotes an integer of 0 or more. From Equation 18 and Equation 19, Equation 20 may be obtained as shown below.

$$\frac{m}{2}\lambda < R_o < \frac{(m+1)}{2}\lambda, \ (n_e - n_o)d \ge \frac{2R_o - (m-1)\lambda}{2\beta} \quad \text{[Equation 20]}$$

Two formulas of Equation 20 are simultaneously satisfied as described above, thereby implementing the transmittance variable window in which the initial transmittance when the voltage V applied between the first electrode E1 and the second electrode E2 is 0 is greater than the minimum transmittance and less than the maximum transmittance, and the transmittance is variable from the minimum transmittance to the maximum transmittance by adjusting the voltage V. As described above, when manufacturing the transmittance variable window, the thickness of the liquid crystal layer LC2 is appropriately set, and thus the initial transmittance may also be a desired value.

Figure 12:
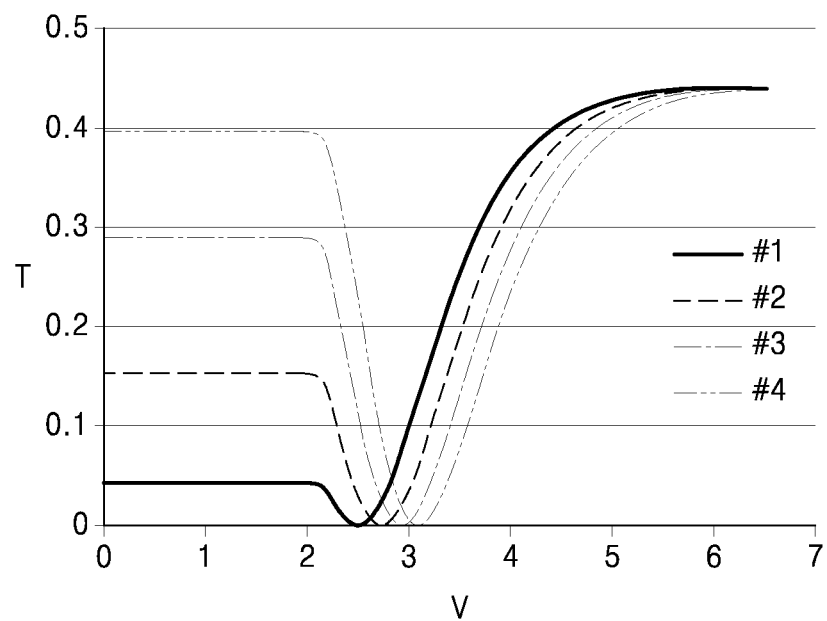
FIG. 12 is a graph schematically showing a change in transmittance according to a voltage in the transmittance variable window of FIG. 9.

FIG. 12 is a graph schematically showing a change in the transmittance T according to the voltage V in a transmittance variable window of FIG. 9. FIG. 12 shows, in a state where the wavelength $\lambda$ of an incidence light is fixed to 550 nm, when values of $(n_e - n_o)d$ and $R_0$ are set as shown in Table 2 below, the change in the transmittance T according to the voltage V between the first electrode E1 and the second electrode E2.

TABLE 2

|  | #1 | #2 | #3 | #4 |
|---|---|---|---|---|
| $(n_e - n_o)d$ | 443 | 511 | 580 | 649 |
| $R_0$ | 55 | 110 | 165 | 220 |

Figure 13:
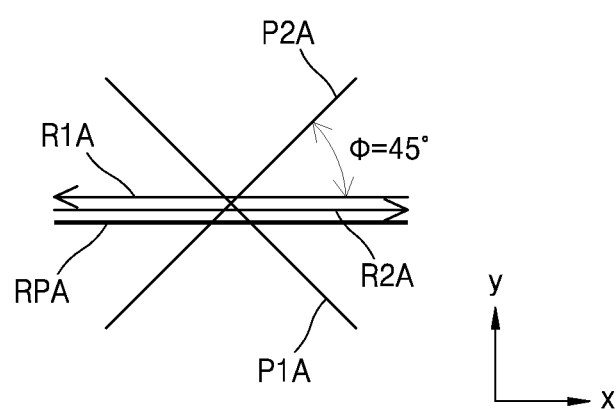
FIG. 13 is a conceptual diagram schematically showing a transmission axis and a rubbing direction of components of a transmittance variable window according to another embodiment of the present disclosure.

All units in Table 2 are nm. As may be confirmed in FIG. 12, it may be seen that when V is 0, the initial transmittance is all greater than the minimum transmittance and less than the maximum transmittance, and as V increases, the transmittance T changes from the minimum transmittance to the maximum transmittance. As may be confirmed in FIG. 12, the initial transmittance may be variously set, and thus, the transmittance variable window of a low power consumption that meets the user's needs may be implemented. FIG. 13 is a conceptual diagram schematically showing the transmission axis P1A and the rubbing direction R1A of components of a transmittance variable window according to another embodiment of the present disclosure. The transmittance variable window according to the present embodiment differs from the transmittance variable windows described above with reference to FIGS. 9 to 12 in that the optical axis (e.g., the retardation axis RPA) of the retardation plate RP is perpendicular to the rubbing direction R1A of the first alignment layer R1 as shown in FIG. 10 in the transmittance variable windows described above with reference to FIGS. 9 to 12, whereas the optical axis RPA of the retardation plate RP is perpendicular to the rubbing direction R1A of the first alignment layer R1 as shown in FIG. 10 in the transmittance variable window according to the present embodiment. In the case of the transmittance variable window according to the present embodiment, Equation 1 described above is applied as it is, but Equation 10 is not applied due to a change in the optical axis of the retardation plate RP and is modified as shown in Equation 21 below.

$$X(V) = \frac{\Delta n(V)d + R_o}{\lambda} \quad \text{[Equation 21]}$$

In the transmittance variable window according to the present embodiment, since the liquid crystal layer LC2 operates in a VA mode, Δn(V) increases as V increases, and X(V) also increases as V increases as described above. Therefore, X(V) has a minimum value and a maximum value as in Equation 22 below.

$$X(0) = \frac{R_o}{\lambda} \le X(V) \le \frac{\beta(n_e - n_o)d + R_o}{\lambda} = X(V_{max}) \quad \text{[Equation 22]}$$

Figure 14:
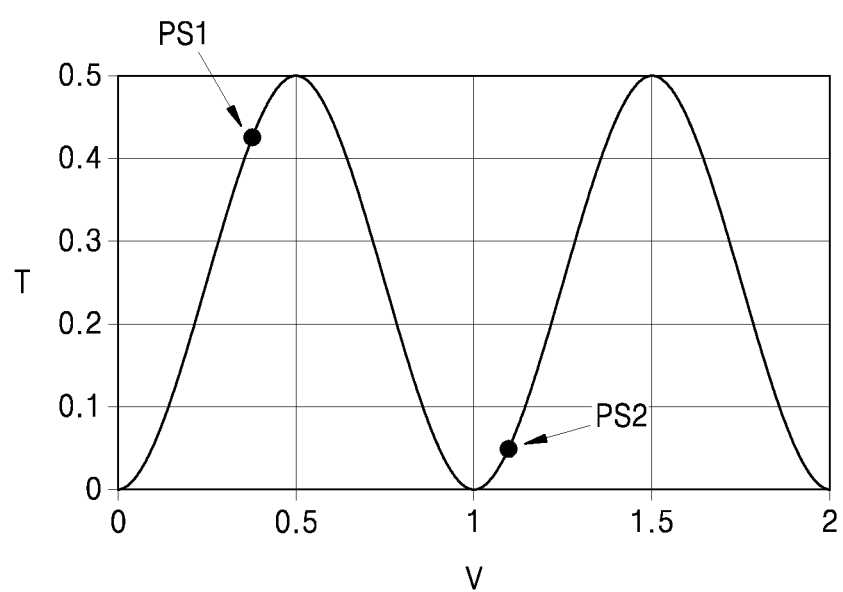
FIG. 14 is a graph illustrating a condition satisfied by the transmittance variable window of FIG. 13.

FIG. 14 is a graph illustrating a condition satisfied by t the transmittance variable window according to the present embodiment. As described above, in the transmittance variable window according to the present embodiment, since the initial transmittance when V is 0 is greater than the minimum transmittance and less than the maximum transmittance, a point where V is 0 may appear, for example, as indicated by PS1 in the graph of FIG. 14. That is, X(0) may be greater than 0 and less than 0.5. In such a situation, if V starts to increase from 0, since X(V) increases at X(0), the transmittance gradually increases to reach the maximum transmittance and then decreases to reach the minimum transmittance. At this time, in order to ensure that the transmittance variable window necessarily reaches the maximum transmittance, a point at which the voltage V applied between the first electrode E1 and the second electrode E2 is the maximum value $V_{max}$ needs to appear as indicated by PS2 in the graph of FIG. 14. That is, $X(V_{max})$ must be 1 or less than 1. This is because V reaches or passes by a point where the transmittance is the minimum, that is, the point where X is 1 in a process of increasing from 0 and reaching the maximum value $V_{max}$.

As may be seen in FIG. 14, X(0) may be greater than 0.5 and less than 1, and $X(V_{max})$ may be 1.5 or have a value greater than 1.5. X(0) may be greater than 1 and less than 1.5, and $X(V_{max})$ may be 2 or have a value greater than 2. Such conditions may be expressed by Equation 23 and Equation 24 shown below.

$$\frac{m}{2} < X(0) = \frac{R_o}{\lambda} < \frac{m+1}{2} \quad \text{[Equation 23]}$$

$$X(V_{max}) = \frac{\beta(n_e - n_o)d + R_o}{\lambda} \ge \frac{(m+2)}{2} \quad \text{[Equation 24]}$$

where m denotes an integer of 0 or more. From Equation 23 and Equation 24, Equation 25 may be obtained as shown below.

$$\frac{m}{2}\lambda < R_o < \frac{(m+1)}{2}\lambda, \ (n_e - n_o)d \ge \frac{-2R_o + (m+2)\lambda}{2\beta} \quad \text{[Equation 25]}$$

Two formulas of Equation 25 are simultaneously satisfied as described above, thereby implementing the transmittance variable window in which the initial transmittance when the voltage V applied between the first electrode E1 and the second electrode E2 is 0 is greater than the minimum transmittance and less than the maximum transmittance, and the transmittance is variable from the minimum transmittance to the maximum transmittance by adjusting the voltage V. As described above, when manufacturing the transmittance variable window, the thickness of the liquid crystal layer LC2 is appropriately set, and thus the initial transmittance may also be a desired value.

Figure 15:
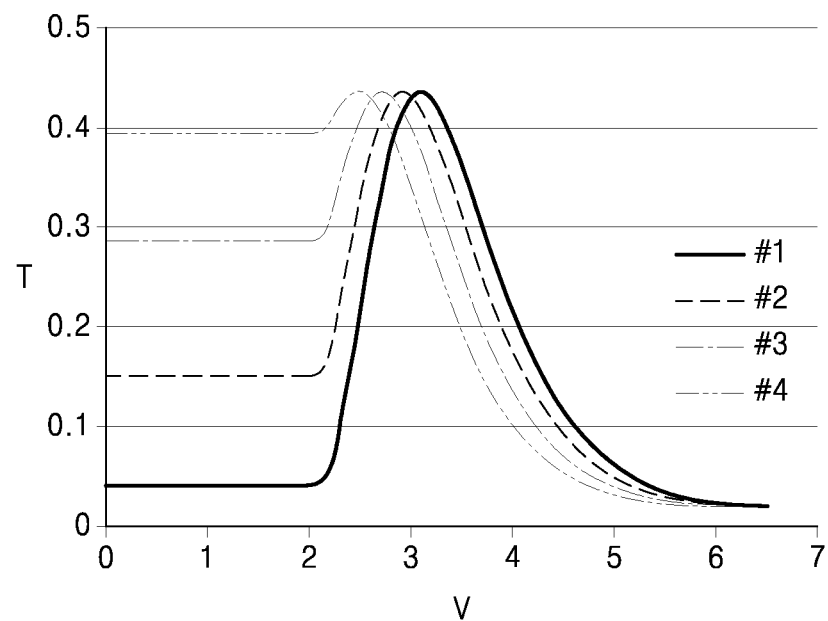
FIG. 15 is a graph schematically showing a change in transmittance according to a voltage in the transmittance variable window of FIG. 13.

FIG. 15 is a graph schematically showing a change in the transmittance T according to the voltage V in the transmittance variable window of the present embodiment. FIG. 15 shows, in a state where the wavelength λ of an incidence light is fixed to 550 nm, when values of $(n_e-n_o)d$ and $R_0$ are set as shown in Table 3 below, the change in the transmittance T according to the voltage V between the first electrode E1 and the second electrode E2.

TABLE 3

|  | #1 | #2 | #3 | #4 |
|---|---|---|---|---|
| $(n_e-n_o)d$ | 649 | 580 | 511 | 443 |
| $R_0$ | 55 | 110 | 165 | 220 |

All units in Table 3 are nm. As may be confirmed in FIG. 15, it may be seen that when V is 0, the initial transmittance is all greater than the minimum transmittance and less than the maximum transmittance, and as V increases, the transmittance T changes from the minimum transmittance to the maximum transmittance. As may be confirmed in FIG. 15, the initial transmittance may be variously set, and thus, the transmittance variable window of a low power consumption that meets the user's needs may be implemented. Meanwhile, the transmission axis P1A of the first polarizing plate P1 and the transmission axis P2A of the second polarizing plate P2 are described as being perpendicular above, but the present disclosure is not limited thereto. That is, in the above-described embodiments, cases in which the transmission axis P1A of the first polarizing plate P1 and the transmission axis P2A of the second polarizing plate P2 are modified to be parallel are also within the scope of the present disclosure.

Figure 16:
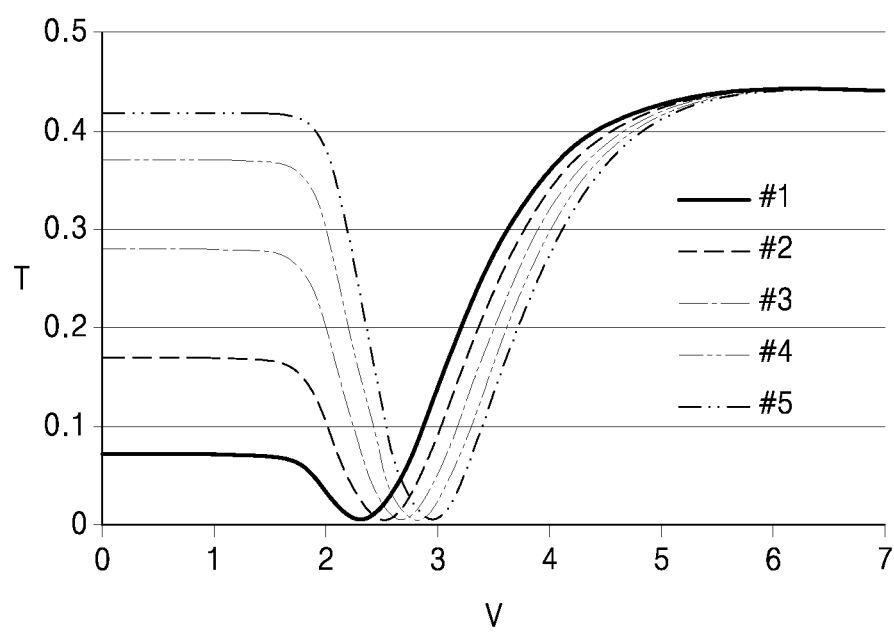
FIG. 16 is a graph showing schematically a change in transmittance according to a voltage in a transmittance variable window according to another embodiment of the present disclosure.

For example, even if the transmission axis P1A of the first polarizing plate P1 and the transmission axis P2A of the second polarizing plate P2 are parallel while having the same configuration as the transmittance variable window according to the embodiment described with reference to FIGS. 5 to 8, it has the same condition as in Equation 16. FIG. 16 is a graph showing schematically a change in the transmittance T according to the voltage V in a transmittance variable window satisfying the condition of Equation 16, while the transmission axis P1A of the first polarizing plate P1 and the transmission axis P2A of the second polarizing plate P2 are parallel. FIG. 16 shows, in a state where the wavelength λ of an incidence light is fixed to 550 nm, when values of $(n_e-n_o)d$ and $R_0$ are set as shown in Table 1 above, the change in the transmittance T according to the voltage V between the first electrode E1 and the second electrode E2.

When comparing FIG. 16 with FIG. 8, it may be confirmed that FIGS. 16 and 8 are exactly up and down symmetrical. This is because the transmission axis P1A of the first polarizing plate P1 and the transmission axis P2A of the second polarizing plate P2 are modified from a vertical state (FIG. 8) to a parallel state (FIG. 16). Except that FIGS. 16 and 8 are up and down symmetrical, it may also be seen in FIG. 16, when V is 0, the initial transmittance is all greater than the minimum transmittance and less than the maximum transmittance, and as V increases, the transmittance T changes from the minimum transmittance to the maximum transmittance. As may be confirmed in FIG. 16, the initial transmittance may be variously set, and thus, the transmittance variable window of a low power consumption that meets the user's needs may be implemented.

Even in the embodiment described above with reference to FIGS. 1 to 4, the transmission axis P1A of the first polarizing plate P1 and the transmission axis P2A of the second polarizing plate P2 may be modified from the vertical state (FIG. 8) to the parallel state (FIG. 16), in the embodiment described above with reference to FIGS. 9 to 12, the transmission axis P1A of the first polarizing plate P1 and the transmission axis P2A of the second polarizing plate P2 may be modified from the vertical state (FIG. 8) to the parallel state (FIG. 16), and in the embodiment described above with reference to FIGS. 13 to 15, the transmission axis P1A of the first polarizing plate P1 and the transmission axis P2A of the second polarizing plate P2 may be modified from the vertical state (FIG. 8) to the parallel state (FIG. 16).

Figure 17:
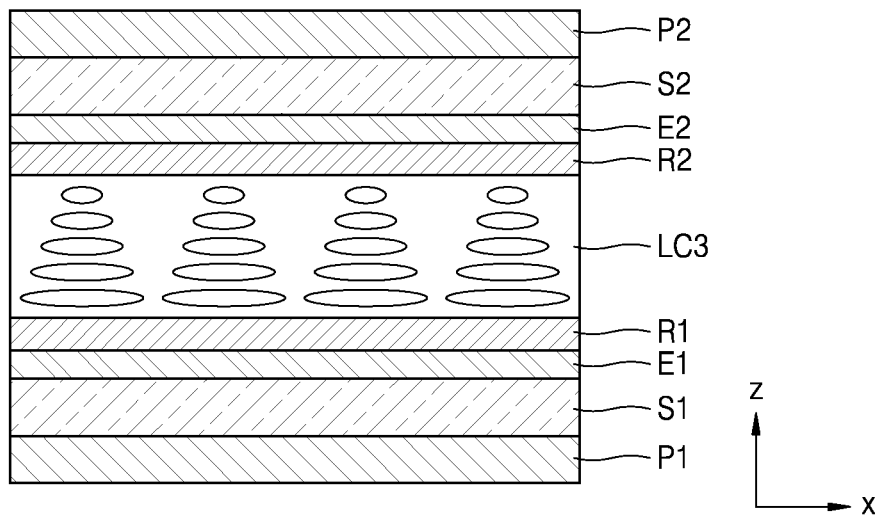
FIG. 17 is a cross-sectional view schematically showing a transmittance variable window according to another embodiment of the present disclosure.
Figure 18:
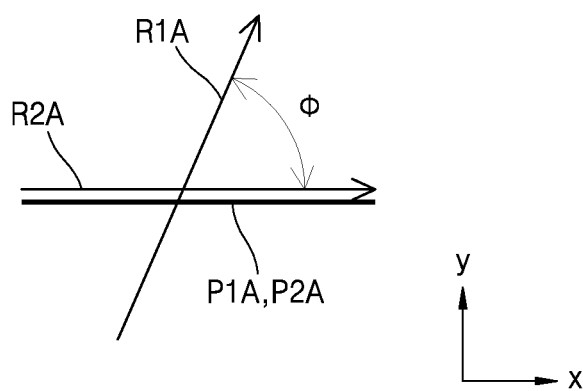
FIG. 18 is a conceptual diagram schematically showing a transmission axis and a rubbing direction of components of the transmittance variable window of FIG. 17.

FIG. 17 is a cross-sectional view schematically showing a transmittance variable window according to another embodiment of the present disclosure. FIG. 18 is a conceptual diagram schematically showing the transmission axis P1A and the rubbing direction R1A of components of the transmittance variable window of FIG. 17.

The transmittance variable window according to the present embodiment differs from the transmittance variable window described above with reference to FIG. 1 in that a liquid crystal layer LC3 operates in a twisted nematic (TN) mode. In the case of the transmittance variable window according to the present embodiment, the transmission axis P1A of the first polarizing plate P1, the transmission axis P2A of the second polarizing plate P2, and the rubbing direction R2A of the second alignment layer R2 are parallel. In addition, the rubbing direction R1A of the first alignment layer R1 forms an angle Φ with the rubbing direction R2A of the second alignment layer R2. This Φ may be called a twist angle, which is greater than 0 degree and less than 270 degrees.

In the transmittance variable window according to the present embodiment, the transmittance when the voltage V between the first electrode E1 and the second electrode E2 is 0 may be expressed by Equation 26 below.

$$T = \frac{1}{2}\left\{\left(\cos X \cos\Phi + \Phi\frac{\sin X}{X}\sin\Phi\right)^2 + \frac{\Gamma^2 \sin^2 X}{4X^2}\cos^2\Phi\right\}$$ [Equation 26]

Here, X and F are defined as follows.

$$X = \sqrt{\Phi^2 + (\Gamma/2)^2}, \Gamma = \frac{2\pi\Delta nd}{\lambda}$$ [Equation 27]

Figure 19:
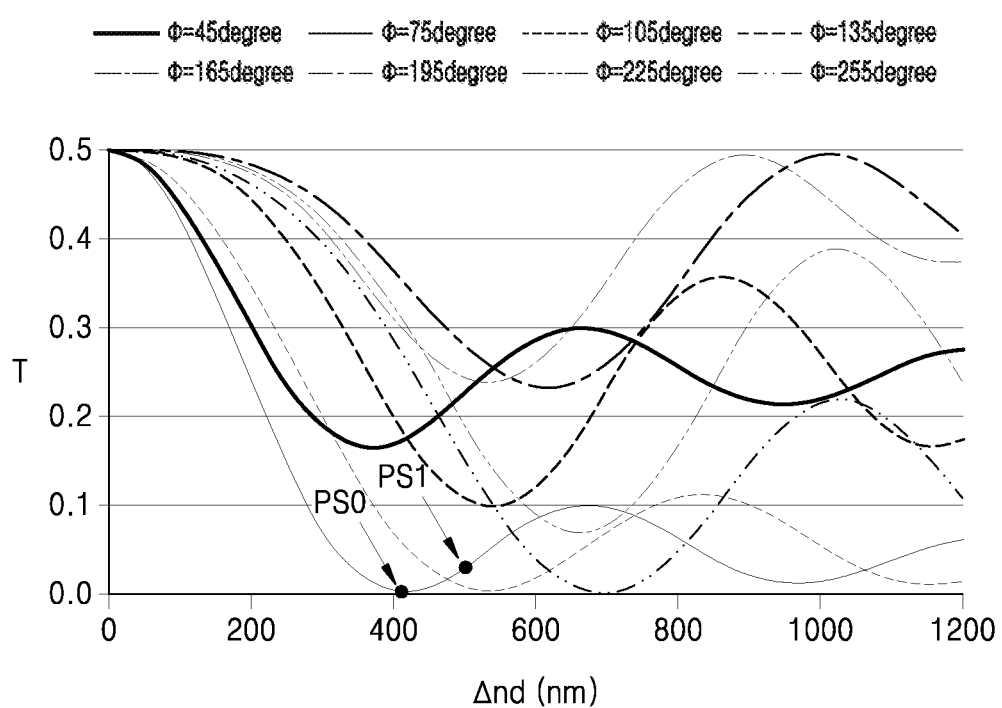
FIG. 19 is a graph illustrating a condition satisfied by the transmittance variable window of FIG. 17.

If the horizontal axis is Δnd and the vertical axis is the transmittance T using the twist angle Φ as a parameter using Equation 26 and Equation 27, it may be represented by a graph as shown in FIG. 19. For reference, in FIG. 19, λ is set to 550 nm, and the unit of the horizontal axis is nm. As may be seen in FIG. 19, the initial transmittance may be the maximum transmittance or the minimum transmittance depending on the Δnd value. In FIG. 19, when Δnd is set to be greater than the Δnd value at a point of the minimum transmittance (PS0 when φ is 75 degrees) (e.g., PS1), it may be seen that the initial transmittance is greater than the minimum transmittance and less than the maximum transmittance. In FIG. 19, in the graph of each φ, the point of the minimum transmittance is the point at which a formula is differentiated and 0 using Δnd representing the graph as a variable, which may be obtained through a numerical analysis and expressed as shown in Table 4 below.

TABLE 4

Figure 20:
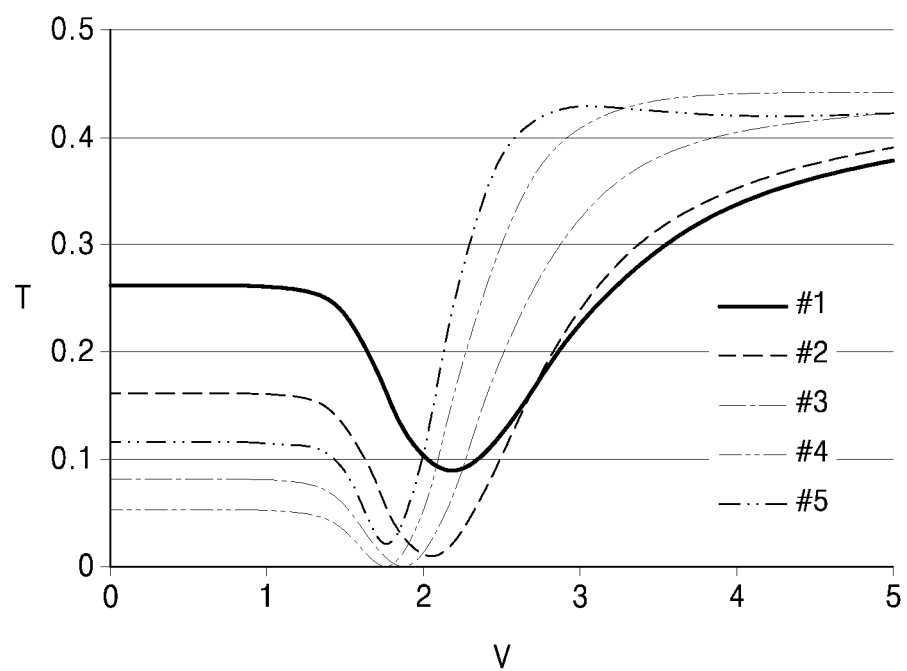
FIG. 20 is a graph schematically showing a change in transmittance according to a voltage in the transmittance variable window of FIG. 17.

| φ | 1 | 2 | 3 | ... 74 | 75 | 76 | ... 267 | 268 | 269 |
|---|---|---|---|---|---|---|---|---|---|
| Δnd | 357.6 | 357.6 | 357.7 | ... 409.6 | 412.4 | 415.5 | ... 719.5 | 722.2 | 724.9 | where the unit of Φ is "degree" and the unit of Δnd is nm. Therefore, if the value of Δnd is greater than the value shown in Table 4, the initial transmittance may be positioned between the lowest transmittance and the highest transmittance. For example, when the twist angle φ is 75 degrees, if Δnd is larger than 412.4 nm, the initial transmittance may be positioned between the lowest transmittance and the highest transmittance. FIG. 20 is a graph schematically showing a change in the transmittance T according to the voltage V in a transmittance variable window of FIG. 17. FIG. 20 shows, in a state where the wavelength λ of an incidence light is fixed to 550 nm, when values of Δnd and Φ are set as shown in Table 5 below, the change in the transmittance T according to the voltage V between the first electrode E1 and the second electrode E2.

TABLE 5

|  | #1 | #2 | #3 | #4 | #5 |
|---|---|---|---|---|---|
| Φ | 45 | 60 | 75 | 90 | 105 |
| Δnd | 680 | 680 | 690 | 780 | 860 |

In Table 5, the unit of Φ is "degree" and the unit of Δnd is nm. As may be confirmed in FIG. 20, it may be seen that when V is 0, the initial transmittance is all greater than the minimum transmittance and less than the maximum transmittance, and as V increases, the transmittance T changes from the minimum transmittance to the maximum transmittance. As may be confirmed in FIG. 20, the initial transmittance may be variously set, and thus, the transmittance variable window of a low power consumption that meets the user's needs may be implemented. Meanwhile, the transmission axis P1A of the first polarizing plate P1 and the transmission axis P2A of the second polarizing plate P2 are described as being parallel in the embodiment described with reference to FIGS. 17 to 20, but the present disclosure is not limited thereto. That is, in the configuration of FIG. 17, the case in which the transmission axis P1A of the first polarizing plate P1 and the transmission axis P2A of the second polarizing plate P2 are modified to be perpendicular is also within the scope of the present disclosure.

Figure 21:
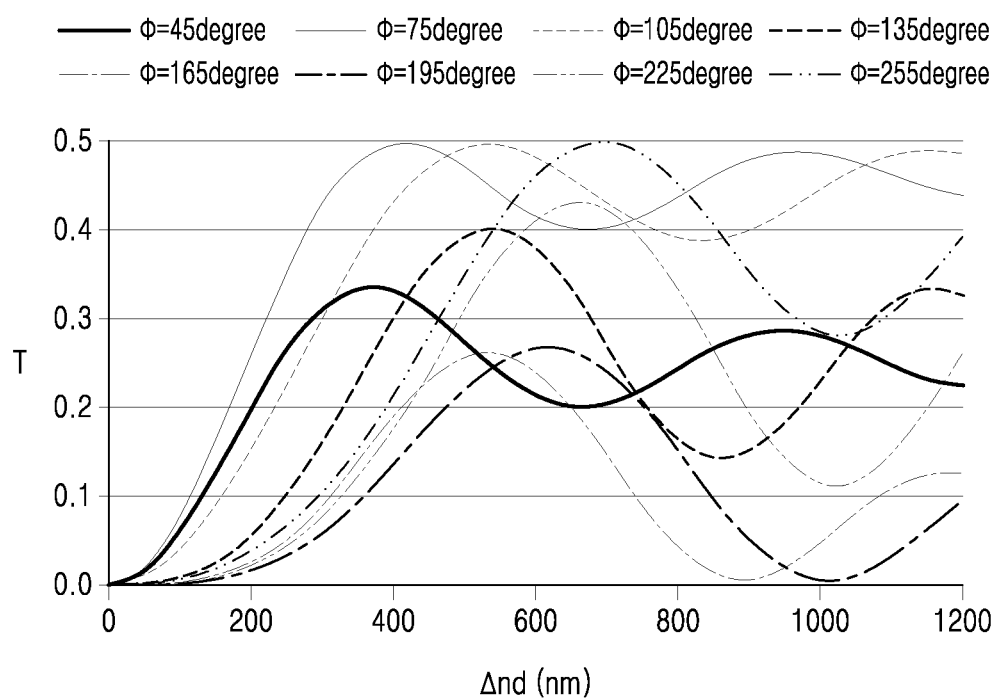
FIG. 21 is a graph showing schematically a change in transmittance according to a voltage in a transmittance variable window according to another embodiment of the present disclosure.

For example, even if in the configuration of FIG. 17, the transmission axis P1A of the first polarizing plate P1 and the transmission axis P2A of the second polarizing plate P2 are perpendicular, Equation 26 and Equation 27 are applied as they are. However, if the horizontal axis is Δnd and the vertical axis is the transmittance T using the twist angle Φ as a parameter, it may be represented by a graph as shown in FIG. 21. When comparing FIG. 21 with FIG. 19, it may be confirmed that FIGS. 21 and 19 are exactly up and down symmetrical. This is because the transmission axis P1A of the first polarizing plate P1 and the transmission axis P2A of the second polarizing plate P2 are modified from a parallel state (FIG. 19) to a vertical state (FIG. 21). Except that FIGS. 21 and 19 are up and down symmetrical, the description provided with reference to FIG. 19 may be applied to FIG. 21 as it is. That is, in FIG. 21, in the graph of each φ, the point of the maximum transmittance is the point at which a formula is differentiated and 0 using Δnd representing the graph as a variable, which may be obtained through a numerical analysis and may be the same result as shown in Table 4 above.

Therefore, if the value of Δnd is greater than the value shown in Table 4, the initial transmittance may be positioned between the lowest transmittance and the highest transmittance. For example, when the twist angle φ is 75 degrees, if Δnd is larger than 412.4 nm, the initial transmittance may be positioned between the lowest transmittance and the highest transmittance.

In the embodiments above, λ may be set to be 550 nm. This is because human perceives light of this wavelength as the brightest light among a visible light.

Meanwhile, the transmittance variable window according to the embodiments above may further include a sensor that detects the ambient brightness. In addition, the transmittance may be maintained constant by adjusting V as described above according to the ambient brightness detected by the sensor.

Figure 22:
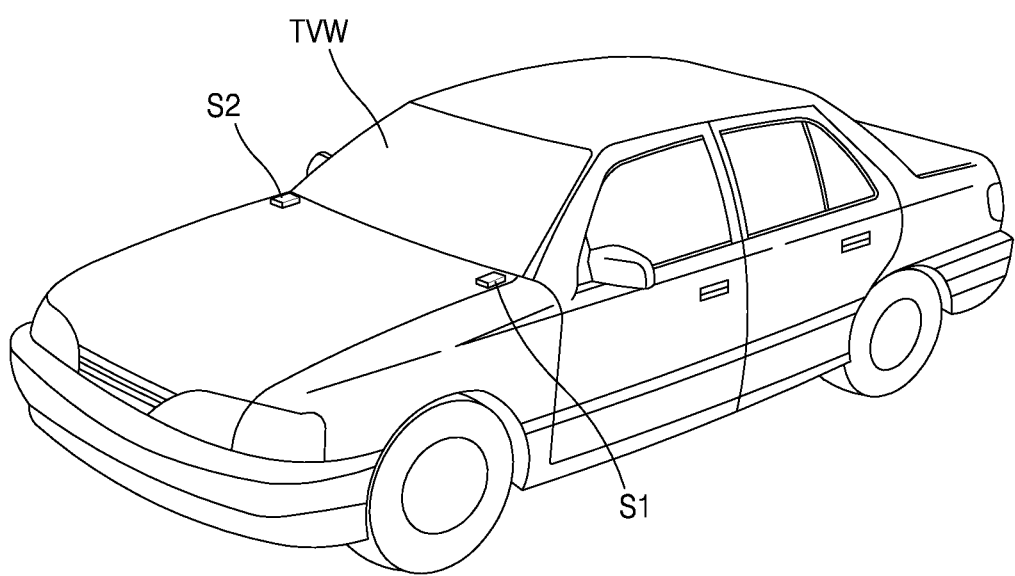
FIG. 22 is a perspective view schematically showing a moving means according to an embodiment of the present disclosure.

FIG. 22 is a perspective view schematically showing moving apparatus according to an embodiment of the present disclosure. As shown in FIG. 22, the moving means (moving apparatus) such as a vehicle may be equipped with a transmittance variable window according to any one of the above-described embodiments. FIG. 22 illustrates a front glass window replaced with the transmittance variable window (TVW) according to any one of the above-described embodiments. The transmittance variable window may be applied to a window other than the front glass window.

Even in this case, the ambient light may be detected using sensors S1 and S2, and V may be adjusted according to the detected ambient light brightness as described above, and thus the transmittance may be maintained constant. At this time, as shown in FIG. 22, the sensors S1 and S2 may be positioned at both ends of the transmittance variable window, and the average of the ambient brightness detected by the sensors S1 and S2 may be regarded as the final ambient brightness, and accordingly, the transmittance of the transmittance variable window may be adjusted. Accordingly, the ambient brightness may be more accurately determined and the transmittance variable window may have a transmittance suitable for the situation.

The transmittance variable window according to the above-described embodiments may be applied not only to the moving means, but also to various fields. For example, the transmittance variable window may also be applied to glass windows of buildings.

Meanwhile, in the transmittance variable windows according to the above-described various embodiments and modifications thereof, at least one of the first polarizing plate P1 and the second polarizing plate P2 may be a reflective polarizing plate. If an absorption type polarizing plate is used in the transmittance variable window that replaces a glass window of the moving means or the building, the absorption type polarizing plate may absorb light energy and dissipate heat, thereby causing a rise in the temperature inside the moving means or the building. However, when a reflective polarizing plate is used, heat is not generated from the polarizing plate, thereby preventing the rise in the temperature inside the moving means or the building, and accordingly reducing consumption of electricity due to use of an air conditioner. In a region where the average temperature is low, on the contrary, use of the absorption type polarizing plate may be helped to slightly reduce the heating cost.

The present disclosure has been described with reference to the embodiments illustrated in the drawings for clarity, but this is merely exemplary, and it will be understood by those skilled in the art that various modifications and equivalent other embodiments therefrom are possible. Therefore, the true technical protection scope of the present disclosure will be defined by the appended claims.

INDUSTRIAL APPLICABILITY

According to an embodiment of the present disclosure, by providing a window having a variable transmittance and a movable body including the same, the embodiments of the present disclosure can be applied to a vehicle, a ship, an aircraft, etc. on which the window is disposed.

The invention claimed is:

1. A transmittance variable window comprising:
a first substrate and a second substrate facing each other;
a first electrode and a first alignment layer sequentially stacked on a surface of the first substrate, the surface facing the second substrate;
a second electrode and a second alignment layer sequentially stacked on a surface of the second substrate, the surface facing the first substrate;
a liquid crystal layer interposed between the first alignment layer and the second alignment layer;
a first polarizing plate disposed on a surface of the first substrate, the surface facing away from the second substrate; and
a second polarizing plate disposed on a surface of the second substrate, the surface facing away from the first substrate,
wherein if a potential difference applied between the first electrode and the second electrode is V, considering an incident light incident on any one of the first polarizing plate and the second polarizing plate and a transmitting light passing through the other one of the first polarizing plate and the second polarizing plate, a transmittance defined as a ratio of the intensity of the transmitting light to the intensity of the incident light varies between a minimum transmittance and a maximum transmittance as V changes, and an initial transmittance when V is 0 is greater than the minimum transmittance and less than the maximum transmittance,
wherein a rubbing direction of the first alignment layer and a rubbing direction of the second alignment layer are opposite, a first transmission axis of the first polarizing plate which is a linear polarizing plate forms an angle of 45 degrees with the rubbing direction of the first alignment layer, and a second transmission axis of the second polarizing plate which is a linear polarizing plate is parallel or perpendicular to the first transmission axis, and
wherein when the liquid crystal layer is a liquid crystal layer operating in an electrically controlled birefringence (ECB) mode, an extraordinary refractive index of the liquid crystal layer is ne, an ordinary refractive index is no, a minimum value of a ratio of a refractive index anisotropy of the liquid crystal layer is α when V is not 0 with respect to $n_e$-$n_o$, a wavelength of light incident on the first polarizing plate is λ, and m is an integer greater than or equal to 0, a thickness d of the liquid crystal layer satisfies Equation 9:

$$\frac{m}{2} + 1 < \frac{(n_e - n_o)d}{\lambda} \le \frac{(m+1)}{2\alpha}. \quad \text{[Equation 9]}$$

2. The transmittance variable window of claim 1, wherein as V increases from 0, the transmittance decreases from the initial transmittance to reach the minimum transmittance and then increases to reach the maximum transmittance, or the transmittance increases from the initial transmittance to reach the maximum transmittance and then decreases to reach the minimum transmittance.

3. A transmittance variable window comprising:
a first substrate and a second substrate facing each other;
a first electrode and a first alignment layer sequentially stacked on a surface of the first substrate, the surface facing the second substrate;
a second electrode and a second alignment layer sequentially stacked on a surface of the second substrate, the surface facing the first substrate;
a liquid crystal layer interposed between the first alignment layer and the second alignment layer;
a first polarizing plate disposed on a surface of the first substrate, the surface facing away from the second substrate;
a second polarizing plate disposed on a surface of the second substrate, the surface facing away from the first substrate; and
a retardation plate interposed between the second substrate and the second polarizing plate, wherein an optical axis of the retardation plate is perpendicular to a rubbing direction of the first alignment layer,
wherein if a potential difference applied between the first electrode and the second electrode is V, considering an incident light incident on any one of the first polarizing plate and the second polarizing plate and a transmitting light passing through the other one of the first polarizing plate and the second polarizing plate, a transmittance defined as a ratio of the intensity of the transmitting light to the intensity of the incident light varies between a minimum transmittance and a maximum transmittance as V changes, and an initial transmittance when V is 0 is greater than the minimum transmittance and less than the maximum transmittance,
wherein a rubbing direction of the first alignment layer and a rubbing direction of the second alignment layer are opposite, a first transmission axis of the first polarizing plate which is a linear polarizing plate forms an angle of 45 degrees with the rubbing direction of the first alignment layer, and a second transmission axis of the second polarizing plate which is a linear polarizing plate is parallel or perpendicular to the first transmission axis, and
wherein when the liquid crystal layer is a liquid crystal layer operating in an ECB mode, an extraordinary refractive index of the liquid crystal layer is $n_e$, an ordinary refractive index is $n_o$, a phase difference of the retardation plate is $R_0$, a minimum value of a ratio of a refractive index anisotropy of the liquid crystal layer is α when V is not 0 with respect to $n_e$-$n_o$, a wavelength of light incident on the first polarizing plate is λ, and m is an integer greater than or equal to 0, a thickness d of the liquid crystal layer satisfies Equation 16:

$$R_o + \frac{(m+1)}{2}\lambda < (n_e - n_o)d \le \frac{R_o}{\alpha} + \frac{m}{2\alpha}\lambda, \quad \text{[Equation 16]}$$

$$\text{for } R_o < \left(\frac{\alpha}{1-\alpha} - \frac{m}{2}\right)\lambda$$

$$R_o + \frac{(m+1)}{2}\lambda < (n_e - n_o)d < R_o + \frac{m+2}{2}\lambda,$$

$$\text{for } R_o \ge \left(\frac{\alpha}{1-\alpha} - \frac{m}{2}\right)\lambda.$$

4. A transmittance variable window comprising:
a first substrate and a second substrate facing each other;
a first electrode and a first alignment layer sequentially stacked on a surface of the first substrate, the surface facing the second substrate;
a second electrode and a second alignment layer sequentially stacked on a surface of the second substrate, the surface facing the first substrate;
a liquid crystal layer interposed between the first alignment layer and the second alignment layer;
a first polarizing plate disposed on a surface of the first substrate, the surface facing away from the second substrate;
a second polarizing plate disposed on a surface of the second substrate, the surface facing away from the first substrate; and
a retardation plate interposed between the second substrate and the second polarizing plate, wherein an optical axis of the retardation plate is perpendicular to a rubbing direction of the first alignment layer,
wherein if a potential difference applied between the first electrode and the second electrode is V, considering an incident light incident on any one of the first polarizing plate and the second polarizing plate and a transmitting light passing through the other one of the first polarizing plate and the second polarizing plate, a transmittance defined as a ratio of the intensity of the transmitting light to the intensity of the incident light varies between a minimum transmittance and a maximum transmittance as V changes, and an initial transmittance when V is 0 is greater than the minimum transmittance and less than the maximum transmittance,
wherein a rubbing direction of the first alignment layer and a rubbing direction of the second alignment layer are opposite, a first transmission axis of the first polarizing plate which is a linear polarizing plate forms an angle of 45 degrees with the rubbing direction of the first alignment layer, and a second transmission axis of the second polarizing plate which is a linear polarizing plate is parallel or perpendicular to the first transmission axis, and
wherein when the liquid crystal layer is a liquid crystal layer operating in a vertically aligned (VA) mode, an extraordinary refractive index of the liquid crystal layer is $n_e$, an ordinary refractive index is $n_o$, a phase difference of the retardation plate is $R_0$, a maximum value of a ratio of a refractive index anisotropy of the liquid crystal layer is β when V is not 0 with respect to $n_e$-$n_o$, a wavelength of light incident on the first polarizing plate is λ, and m is an integer greater than or equal to 0, a thickness d of the liquid crystal layer satisfies Equation 20:

$$\frac{m}{2}\lambda < R_o < \frac{(m+1)}{2}\lambda, \ (n_e - n_0)d \geq \frac{2R_o - (m-1)\lambda}{2\beta}.$$ [Equation 20]

5. A transmittance variable window comprising:
a first substrate and a second substrate facing each other;
a first electrode and a first alignment layer sequentially stacked on a surface of the first substrate, the surface facing the second substrate;
a second electrode and a second alignment layer sequentially stacked on a surface of the second substrate, the surface facing the first substrate;
a liquid crystal layer interposed between the first alignment layer and the second alignment layer;
a first polarizing plate disposed on a surface of the first substrate, the surface facing away from the second substrate;
a second polarizing plate disposed on a surface of the second substrate, the surface facing away from the first substrate; and
a retardation plate interposed between the second substrate and the second polarizing plate, wherein an optical axis of the retardation plate is parallel to a rubbing direction of the first alignment layer,
wherein if a potential difference applied between the first electrode and the second electrode is V, considering an incident light incident on any one of the first polarizing plate and the second polarizing plate and a transmitting light passing through the other one of the first polarizing plate and the second polarizing plate, a transmittance defined as a ratio of the intensity of the transmitting light to the intensity of the incident light varies between a minimum transmittance and a maximum transmittance as V changes, and an initial transmittance when V is 0 is greater than the minimum transmittance and less than the maximum transmittance,
wherein a rubbing direction of the first alignment layer and a rubbing direction of the second alignment layer are opposite, a first transmission axis of the first polarizing plate which is a linear polarizing plate forms an angle of 45 degrees with the rubbing direction of the first alignment layer, and a second transmission axis of the second polarizing plate which is a linear polarizing plate is parallel or perpendicular to the first transmission axis, and
when the liquid crystal layer is a liquid crystal layer operating in a VA mode, an extraordinary refractive index of the liquid crystal layer is $n_e$, an ordinary refractive index is $n_o$, a phase difference of the retardation plate is $R_0$, a maximum value of a ratio of a refractive index anisotropy of the liquid crystal layer is $\beta$ when V is not 0 with respect to $n_e$-$n_o$, a wavelength of light incident on the first polarizing plate is $\lambda$, and m is an integer greater than or equal to 0, a thickness d of the liquid crystal layer satisfies Equation 25:

$$\frac{m\lambda}{2} < R_o < \frac{(m+1)\lambda}{2}, \ (n_e - n_o)d \geq \frac{-2R_o + (m+2)\lambda}{2\beta}.$$ [Equation 25]

6. The transmittance variable window of claim 1, wherein $\lambda$ is 550 nm.

7. The transmittance variable window of claim 1, further comprising a sensor configured to detect an ambient brightness, wherein V is adjusted according to the ambient brightness detected by the sensor.

8. The transmittance variable window of claim 1, wherein at least one of the first polarizing plate and the second polarizing plate is a reflective polarizing plate.

9. A moving apparatus equipped with the transmittance variable window of claim 1.

10. The transmittance variable window of claim 3, wherein $\lambda$ is 550 nm.

11. The transmittance variable window of claim 4, wherein $\lambda$ is 550 nm.

12. The transmittance variable window of claim 5, wherein $\lambda$ is 550 nm.

13. The transmittance variable window of claim 3, further comprising a sensor configured to detect an ambient brightness, wherein V is adjusted according to the ambient brightness detected by the sensor.

14. The transmittance variable window of claim 4, further comprising a sensor configured to detect an ambient brightness, wherein V is adjusted according to the ambient brightness detected by the sensor.

15. A moving apparatus equipped with the transmittance variable window of claim 3.

16. A moving apparatus equipped with the transmittance variable window of claim 4.

17. A moving apparatus equipped with the transmittance variable window of claim 5.

* * * * *